United States Patent [19]

Ko et al.

[11] Patent Number: 5,266,844
[45] Date of Patent: Nov. 30, 1993

[54] TIMING DISCRIMINATOR CIRCUIT AND METHOD FOR DETERMINING THE ARRIVAL ORDER OF INPUT SIGNALS

[75] Inventors: Herbert L. Ko, Mountain View; Gregory S. Lee, Palo Alto, both of Calif.

[73] Assignee: Hewlett-Packard Company, Palo Alto, Calif.

[21] Appl. No.: 730,151

[22] Filed: Jul. 15, 1991

[51] Int. Cl.$^5$ .................. H03K 3/38; H03K 17/92; H03K 3/00
[52] U.S. Cl. .................. 307/306; 307/245; 307/277; 307/541
[58] Field of Search ............... 307/306, 277, 245, 541

[56] References Cited

U.S. PATENT DOCUMENTS

| | | | |
|---|---|---|---|
| 4,631,423 | 12/1986 | Faris | 307/306 |
| 4,902,908 | 2/1990 | Harada | 307/245 |
| 4,916,335 | 10/1990 | Goto et al. | 307/306 |
| 4,947,118 | 8/1990 | Fujimaki | 307/306 |

FOREIGN PATENT DOCUMENTS 0076160 4/1983 European Pat. Off. .

OTHER PUBLICATIONS

Hamilton et al, "Analog Measurement Applications For High Speed Josephson Switches", IEEE Transactions on Magnetics, vol. Mag. 17, No. 1, Jan. 1981, pp. 577-582.

*Primary Examiner*—William L. Sikes
*Assistant Examiner*—Trong Phan

[57] ABSTRACT

The present invention is directed to systems and methods capable of analyzing a wide variety of input signal waveforms to arbitrate their arrival sequence with a high resolution. In an exemplary embodiment, the apparatus is an arbiter circuit which includes an input means for inputting signals whose waveforms are to be analyzed, a comparator means for distinguishing arrival times of the input signals, the comparator means further including means for quantizing flux, and an output means for outputting information which identifies the arrival of at least one of the input signals. In an alternate embodiment, feedback means are provided for compensating asymmetries in the comparator means.

26 Claims, 5 Drawing Sheets

TIMING DISCRIMINATOR CIRCUIT AND METHOD FOR DETERMINING THE ARRIVAL ORDER OF INPUT SIGNALS

BACKGROUND OF THE INVENTION

1. Field of the Invention

The present invention relates generally to signal processing. More particularly, the invention relates to circuits and methods for arbitrating relative timing between two waveforms.

2. State of the Art

Known signal processors include coincidence detector circuits, race arbiter circuits and time difference analyzers having semiconductor latching circuits. For example, these signal processors are used in frequency or phase modulation systems (e.g., FM or PM modulation domain analyzers) to detect a signal's frequency or phase relative to that of a reference signal.

A typical coincidence detector circuit is a latching AND gate which detects the outputs from two separately triggered pulse generators. A typical race arbiter circuit is an arrangement of flip-flops that identifies which of two signals is received first. A time difference analyzer can be formed as a combination of semiconductor logic gates and a digital timer (e.g., counter) which detects the phase difference between a received signal and a reference signal.

Although simplistic in architecture, the foregoing circuits suffer significant drawbacks. For example, semiconductor latching circuits (e.g., latching AND gates) are limited to the detection of relatively slow (i.e., low frequency) input signals with relatively long pulse widths. The resolution of these circuits becomes increasingly limited as higher frequency signals of shorter pulse width are received. Similarly, flip-flops are typically limited to use with relatively slow signals, and can be especially unstable under certain circumstances (e.g., noisy environments).

To address the need for faster, more accurate signal processing, coincidence detector circuits have been proposed which include multipliers for multiplying two input signals together. The resulting signal is processed with a low pass filter (i.e., integrator) and threshold detector. While such circuits have achieved improved time resolution (e.g., 20 ps resolution), the threshold of the threshold detector must be readjusted any time the input signal waveforms are changed. These circuits therefore require constant monitoring and readjustment and are limited to the resolution mentioned above. Further, these circuits are limited to detecting sharply pulsed input signals due to the inherent background noise generated by the multiplier.

Other areas of signal processing have more recently focused on the use of superconducting electronics to improve speed and resolution. For example, known superconducting devices are capable of highly accurate magnetic flux detection. However, these devices have been limited to relatively basic signal detection. Superconducting devices have not, for example, been employed in more sophisticated signal processing such as arbitrating the relative timing between two waveforms.

Two known superconducting devices are the Superconducting Quantum Interference Device (SQUID) and the Quantum Flux Parametron (QFP). Both of these devices are signal comparators capable of detecting magnetic flux with high resolution.

Both the SQUID and the QFP achieve high resolution flux detection through the use of Josephson-junction circuit elements (i.e., Josephson junctions). Josephson junctions are described in a document entitled "Superconducting electronics", *Physics Today*, Feb. 1981 by Donald G. McDonald, the disclosure of which is hereby incorporated by reference in its entirety.

As described in the aforementioned document, superconducting loops which include Josephson junctions are devices which exploit the concept of magnetic flux quantization. Generally speaking, magnetic flux quantization refers to the ability of superconducting loops, or rings, to trap the magnetic field of a permanently circulating supercurrent in discrete units.

Josephson junctions are typically formed from two thin films of superconducting metals separated by a thin insulating layer. An electrical current is conducted across the two thin films. A zero voltage drop occurs across the films when current is below a predetermined maximum level referred to as the "critical current". Currents which exceed the critical current (e.g., approximately 1 mA) produce a voltage drop across the two thin films.

A SQUID is a superconducting loop which is interrupted by two Josephson junctions. Maximum current through the superconducting loop occurs when either junction reaches its critical current. Because the maximum current is a periodic function of the magnetic flux through the SQUID, these devices provide a finely graded measuring scale for magnetic flux detection. The frequency with which the maximum current is detected (i.e., the frequency with which a voltage drop is detected across at least one Josephson junction) represents a measure of magnetic flux through the SQUID.

A document entitled "A Single-Chip SQUID Magnetometer", *IEEE Transactions On Electron Devices*, Vol. 35, No. 12, Dec. 1988 by Norio Fujimaki et al. further describes a SQUID magnetometer. The SQUID magnetometer includes a sensor which changes from a zero-voltage state to a finite voltage state (e.g., approximately 1 mV) when an AC bias current pulse crosses a threshold value. The threshold value is a function of the magnetic flux coupled to the SQUID and depends upon characteristics of the SQUID sensor (i.e., the inductance, the Josephson junction critical currents and the location of the bias current injection point).

U.S. Pat, No. 4,916,335 (Goto et al), the disclosure of which is hereby incorporated by reference in its entirety, discloses a QFP for polarity discrimination of an input signal. As described therein, a QFP is a parametron-type switching circuit which includes a superconducting loop interrupted by two Josephson junctions positioned on opposite sides of a center node. Like the SQUID, the QFP is a highly accurate magnetic flux detector capable of amplifying weak magnetic flux. As the center node inductance of a QFP is increased, its functional behavior approaches that of a SQUID (i.e., the two Josephson junctions become decoupled from one another).

Although superconducting devices such as SQUIDs and QFPs offer the advantages of high speed and high resolution flux detection, these advantages have not been effectively exploited beyond mere signal detection and polarity discrimination. As described above, signal processors are often required to detect and measure the time delays between plural signal waveforms. Despite the availability of superconducting devices, signal processors presently employ conventional arbiter circuits, coincidence detectors and time difference analyzers. These signal processors are therefore limited in their overall speed of operation and flexibility due to restrictions on the input signal waveforms.

Accordingly, there is a need for a signal processor capable of arbitrating a wide range of input signals with high resolution.

SUMMARY OF THE INVENTION

The present invention is directed to systems and methods capable of analyzing high frequency input signal waveforms to arbitrate their arrival sequence with a high resolution. In a preferred embodiment, the invention relates to an apparatus and method for determining the order of arrival of at least two waveforms. In an exemplary embodiment, the apparatus is an arbiter circuit which includes an input means for inputting signals whose waveforms are to be analyzed; a comparator means for comparing arrival times of the input signals by quantizing flux; and an output means for outputting information which identifies the arrival of at least one of the input signals. In an alternate embodiment, feedback means are provided for compensating asymmetries in the comparator means.

Preferred embodiments of circuits and methods designed in accordance with the present invention provide several significant advantages. For example, time differences between plural input signal waveforms having any of a wide range of frequencies can be resolved with an accuracy at least two orders of magnitude better than known circuits. In preferred embodiments, the time differences are resolved with a subpicosecond accuracy. The frequency of the input signals can range from the megahertz (Mhz) region to the gigahertz (Ghz) region.

BRIEF DESCRIPTION OF THE DRAWINGS

Other purposes and advantages of the present invention will become more apparent from the following detailed description of preferred embodiments when read in conjunction with the accompanying drawings, wherein like elements are designated by like numerals and wherein:

FIG. 1b is a graphical representation of mode boundaries associated with an arbiter circuit such as that of FIG. 1a;

DETAILED DESCRIPTION OF THE PREFERRED EMBODIMENTS

Figure 1A:
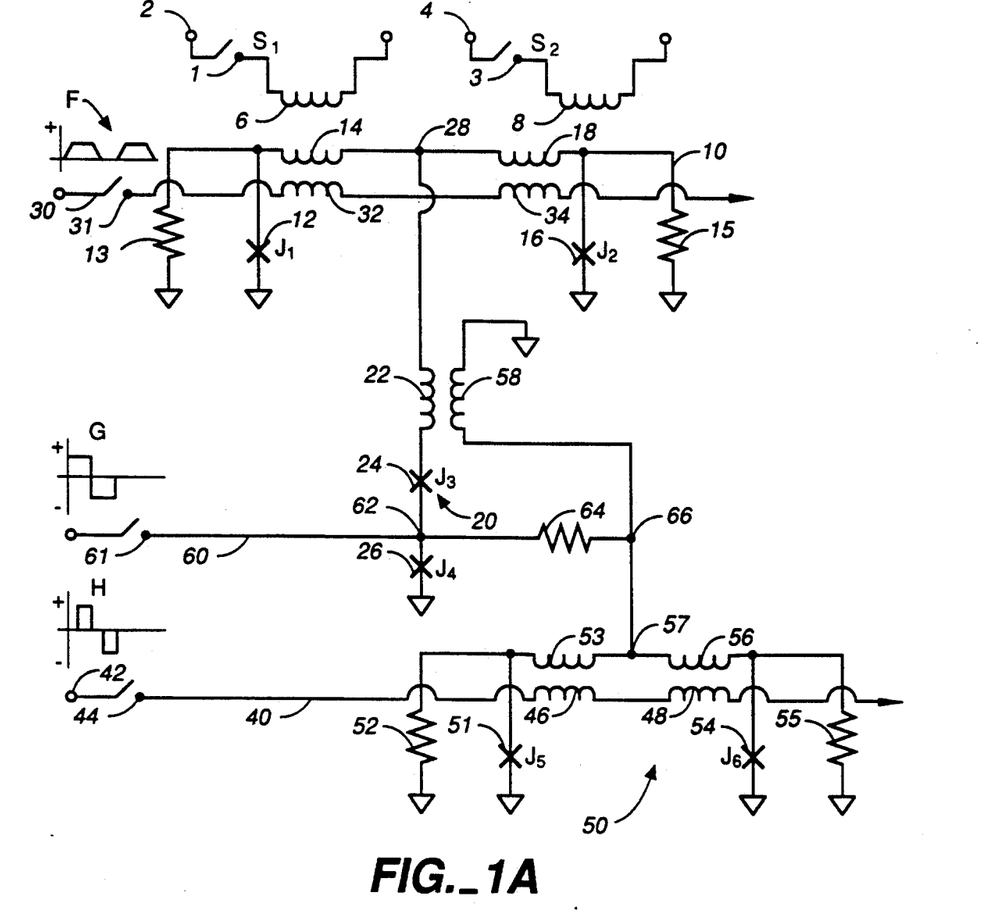
FIG. 1a is an exemplary embodiment of an arbiter circuit in accordance with the present invention.

FIG. 1a shows an exemplary embodiment of an apparatus for determining the arrival order of two waveforms. The exemplary FIG. 1a apparatus is represented generally as an arbiter circuit which includes an input means for inputting signals whose waveforms are to be analyzed, a comparator means for distinguishing arrival times of the input signals by quantizing flux, an optional feedback means for compensating asymmetries in the comparator means, and an output means for outputting information which identifies the arrival of at least one of the input signals.

As shown in FIG. 1a, the input means includes two signal inputs 2 and 4. Each signal input includes an inductor 6 or 8, respectively which receives one of two similar input signal waveforms $S_1$ and $S_2$. Switches 1 and 3 are shown to represent selective input of the signal waveforms $S_1$ and $S_2$ In a preferred embodiment, the inductors 6 and 8 magnetically couple the input means to the comparator means.

The comparator means includes a QFP 10, an output load 20 and a flux input 30. The QFP quantizes flux in two loops. One loop includes a first Josephson junction 12 (labelled $J_1$) in parallel with a shunt resistor 13 and in series with inductors 14 and 22. The other loop includes a second Josephson junction 16 (labelled $J_2$) in parallel with a shunt resistor 15 and in series with inductors 18 and 22.

The shunt resistors 13 and 15 damp oscillations in the comparator means. The inductors 14 and 18 magnetically couple the comparator means with the inductors 6 and 8 of the input means, respectively. However, it will be apparent to those skilled in the art that alternate means can be used for coupling the input signals with the comparator means.

Figure 2:
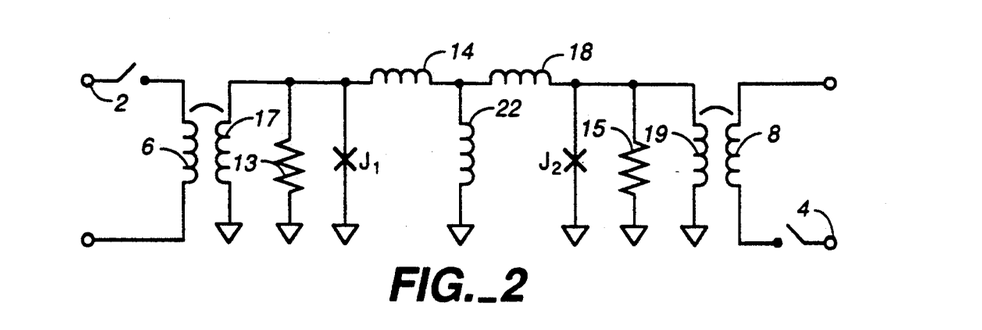
FIG. 2 is an alternate exemplary embodiment of input and comparator portions of the FIG. 1 arbiter circuit.

For example, FIG. 2 shows a portion of the FIG. 1a comparator means which includes separate inductors 17 and 19 for coupling with the input means. The inductors 17 and 19 are relatively large inductors (e.g., 5-10 pH) for shunting the Josephson junctions $J_1$ and $J_2$, respectively.

The output load 20 of the FIG. 1a comparator means stores a voltage state of the comparison means and includes a third Josephson junction 24 (labelled $J_3$) and a fourth Josephson junction 26 (labelled $J_4$). The output load is connected between ground and a node of the inductor 22.

The flux input 30 of the comparator means includes two serially coupled inductors 32 and 34. The inductors 32 and 34 are magnetically coupled with the inductors 14 and 18 of the comparator means.

The flux input of the FIG. 1a comparator means is optional. When included, the flux input line should have identical coupling to each loop of the QFP. If a DC flux input is selected, a modest reduction in the required input signal amplitude is achieved. The amplitude of the DC flux input should be modest in order for the arbiter to reset the arbiter to an initial mode.

In an alternate embodiment, the flux input is a clocked signal. A clocked flux input can substantially reduce the input signal amplitude. An exemplary clocked flux input waveform (shown as waveform F in FIG. 1a) raises the bias before arbitration of the input signals and then lowers bias during a reset of the FIG. 1a circuit (i.e., reset occurs near an endpoint of a falling edge of waveform F). No additional relationship between the flux input waveform and the latch bias control signal is necessary in a preferred embodiment. A switch 31 is provided to illustrate selective control of the flux input.

For large signal amplitudes, the flux input can be eliminated to reduce circuit complexity and improve noiselimited time resolution. This is because a root mean square (rms) time uncertainty ($\Delta t_{rms}$) has been determined to be inversely proportional to the input signal amplitude. This determination follows from the relationship:

$$\Delta t_{rms} = \Delta i_{rms} T_0/I_{sig}$$

where $\Delta i_{rms}$ is the rms noise current produced by the parallel combination of the FIG. 1a shunt resistors 13, 15; $I_{sig}$ is the current amplitude of the input signals $S_1$ and $S_2$; and $T_0$ is the larger of the input signal risetime and the Josephson junction response time. A typical value for $\Delta t_{rms}$ is approximately 0.1 ps.

The two loops of the FIG. 1a comparator means are symmetric about the output load 20. The inductors 14 and 18 are equal value, the critical currents of the Josephson junctions $J_1$ and $J_2$ are of equal value and the shunt resistors 13 and 15 are of equal value. Further, the inductors 6 and 8 of the input means are of approximately equal inductance. Mutual coupling of inductor 6 with inductor 14 is therefore approximately identical to the mutual coupling of inductor 8 with inductor 18.

The accuracy of the FIG. 1a circuit depends upon the symmetry which exists between the two loops of the QFP 10 and the coupling of the input signals. Asymmetries of the comparator means can be introduced by processing variations which occur in the fabrication of the circuit. The most significant source of error is differences which occur in the critical currents of junctions $J_1$ and $J_2$. These differences introduce a small time offset which can limit the time resolution of a multi-arbiter time interpolator to be described below.

To address these processing variations, a feedback means is provided in preferred embodiments. The feedback means includes a feedback control line 40, a feedback SQUID 50 and a relatively large feedback inductor 58. The feedback inductor 58 is approximately fifty or more times larger than the inductor 22, and is weakly coupled to the inductor 22. The feedback control line 40 further includes a feedback control signal input 42, a feedback control switch 44 and two serially connected inductors 46 and 48.

The feedback SQUID 50 further includes two arms. A first arm includes a fifth Josephson junction 51 (labelled $J_5$) in parallel with a shunt resistor 52 and in series with an inductor 53. A second arm includes a sixth Josephson junction 54 (labelled $J_6$) in parallel with a resistor 55 and in series with an inductor 56. A node 57 is located at a midpoint between the two arms of the feedback SQUID. The feedback inductor 58 is serially connected between the node 57 and ground.

The output means includes a latch bias control signal input 60 which is connected to a node 62 between the serially connected Josephson junctions $J_3$ and $J_4$. A switch 61 is included to represent selective activation of the latch bias control signal. The output means further includes a read-out resistor 64 connected between the node 62 and a latch output 66. The latch output 66 corresponds to the node 57 of the feedback means.

Operation of the FIG. 1a arbiter circuit will now be described for determining the arrival sequence of two similar waveforms (e.g., two step waveforms of approximately equal amplitude and frequency). However, it will be appreciated that preferred embodiments are not limited to determining the chronological arrival sequence of two step waveforms. Rather, plural arbiter circuits can be used to determine the precise time delay between two signals. Further, any signal waveform shape can be detected by, for example, directing the waveform through a square wave generator.

Prior to the arrival of either signal $S_1$ or $S_2$, an optional current can be injected to the flux-input 30 of the FIG. 1a arbiter circuit. This injected current induces a magnetic flux in the QFP 10. In a preferred exemplary embodiment, the injected current is a square or trapezoidal pulse (e.g., waveform F) having an amplitude just below the flux-flux transition threshold of the QFP. The term "flux-flux transition threshold" refers to a current amplitude of sufficient strength to alter the magnetic field orientation created by the inductors 14 and 18 of the comparator means. The flux-flux transition threshold is therefore a function of the inductance $L_{14}$ and $L_{18}$ of inductors 14 and 18, respectively as well as the critical currents $I_{c1}$ and $I_{c2}$ of the Josephson junctions $J_1$ and $J_2$, respectively.

Subsequently, first and second signal waveforms $S_1$ and $S_2$ are input to the signal inputs 2 and 4. The polarity of current generated in the output load 20 is used to indicate which of these two signals arrived first.

If $S_1$ arrives at signal input 2 before $S_2$ arrives at signal input 4, then a large positive current flows counterclockwise in the first loop which includes inductor 22, inductor 14 and Josephson junction $J_1$. If this current exceeds the critical current of $J_1$, $J_1$ momentarily switches from its zero voltage superconducting state to a voltage state. $J_1$ produces a pulse which reverses the direction of current circulation in the first loop such that a flux quantum is injected into the first loop. Positive current therefore flows through inductor 22 from node 28 to ground.

A positive current through the output load 20 reduces the flux bias in a second loop which includes inductor 22, inductor 18 and Josephson junction $J_2$. Further, this positive current prevents a flux-flux transition when $S_2$ arrives, thus preventing the Josephson junction $J_2$ from switching to a voltage state.

If the signal $S_2$ arrives at the input 4 before the signal S arrives at the input 2, an opposite sequence of events occurs. A large counterclockwise current is now generated in the second loop. If the critical current of $J_2$ is exceeded, $J_2$ momentarily switches to its voltage state. $J_2$ produces a pulse which reverses the direction of current circulation to inject a flux quantum into the second loop. Negative current therefore flows through inductor 22 from ground to node 28.

A negative current in the output load 20 reduces flux bias in the first loop consisting of inductor 22, inductor 14 and Josephson junction $J_1$. This negative current prevents a flux-flux transition when the signal S1 arrives by preventing the Josephson junction $J_1$ from switching to a voltage state.

The comparator means operation can thus be summarized as follows. The clockwise current which is generated in either loop upon switching of $J_1$ or $J_2$ opposes the current magnetically coupled to the inductors 14 and 18 by the signal inputs 2 and 4. The first input signal waveform to arrive dictates the switching direction of the arbiter circuit and the current polarity of inductor 22 indicates which loop of the comparator means has been triggered.

Figure 1B:
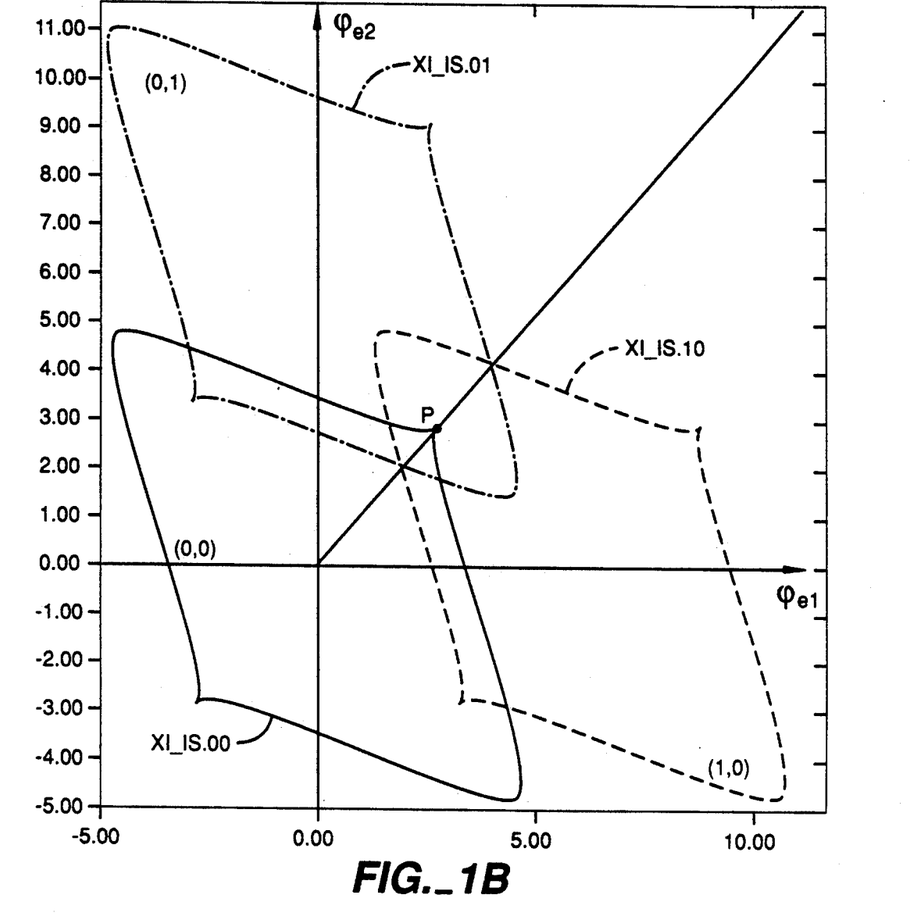

Mode boundaries of the arbiter circuit can be used to determine appropriate circuit parameters and signal magnitudes. For example, a set of exemplary magnetic flux ($\beta$) boundaries for $\beta_{L14}=\beta_{L18}=\beta_{L22}=1$ is shown in FIG. 1b, where $\beta_{L14}=2\pi$ $L_{14}$ $I_{c1}/\Phi_0$; $\beta_{L18}=2\pi$ $L_{18}$ $I_{c2}/\Phi_0$, $\beta_{L22}=2\pi$ $L_{22}$ $I_{c1}/\Phi_0$; and $\Phi_0=2\cdot 10^7$ gauss cm$^{-2}$ is the magnetic flux quantum.

The FIG. 1b axes are in units of normalized applied flux $\phi_{e1}=2\pi$ $\Phi_{e1}/\Phi_0$ and $\phi_{e2}=2\pi$ $\Phi_{e2}/\Phi_0$, where $\Phi_{e1}$ and $\Phi_{e2}$ are the flux coupled to $L_{14}$ and $L_{18}$, respectively. The three closed curves in the FIG. 1b diagram are the boundaries of the three flux states of interest in the arbiter operation. The curve centered at the origin and labelled (0,0) is the mode boundary where no flux has entered either loop of the comparator means. The curves labelled (1,0) and (0,1) are the mode boundaries where one flux quantum has been stored in one or the other of the loops containing $L_{14}$ or $L_{18}$, respectively.

Using the FIG. 1b diagram, the operation of the FIG. 1a circuit can be described as follows. The circuit starts in the (0,0) mode with no flux input due to the absence of FIG. 1a input signal waveforms $S_1$ and $S_2$. If the flux input is such that the mode boundary is crossed above the cusp labelled P in FIG. 1b (located on the line $\phi_{e1}=\Phi_{e2}$ for symmetric circuits), the circuit switches to the (0,1) mode. This is the case where the signal $S_1$ arrived before signal $S_2$. Alternately, if the order of arrival of $S_1$ and $S_2$ is reversed, the final state of the circuit is the (1,0) mode.

In a preferred embodiment, the comparator means of FIG. 1a resets to its initial state if all current inputs are switched off. This includes the input signals $S_1$, $S_2$, the flux input 30, the latch bias control signal input 60 and the feedback input 42. Stored energy is dissipated through the resistors 13, 15, 52 and 55 of the comparator QFP and feedback SQUID respectively.

Inclusion of the optional feedback means influences operation of the FIG. 1a circuits as follows. The feedback means is activated by placing the feedback control switch 44 in an on position. A current is thereby passed through the feedback control line 40 to generate a single flux quanta in the feedback SQUID 50. This flux quanta possesses the same polarity as the latch output 66, and is injected into the feedback inductor 58.

The feedback inductor 58 thus serves as a flux storage device. Flux accumulated in the inductor 58 is coupled with the inductor 22 to provide negative feedback by creating an effective current bias for the QFP 10. When the feedback is complete, switch 44 is returned to the off position for normal circuit operation.

In the exemplary FIG. 1a circuit, there are two general types of feedback compensation. In a first general type, the flux bias line 30 is used to switch the QFP 10 (e.g., input waveform F shown in FIG. 1a) with no signals present at inputs 2 and 4. In a second general type, reference signals are input to the signal inputs 2 and 4 during a feedback compensation cycle.

With the first type of feedback compensation, compensation is complete when the Josephson junction $J_4$ switches to a positive voltage as often as it switches to a negative voltage state. The feedback control line 40 is then disabled by turning off the feedback control switch 44. At this point, the flux stored in the feedback inductor 58 becomes fixed and offsets asymmetries between the two loops of the QFP 10. However, differences in the coupling of the input signals are not compensated.

With the second type of feedback compensation, a single reference signal is generated and split into two separate input signals. The identical input signals are directed to the signal inputs 2 and 4 during activation of the feedback control line 40 to compensate input coupling asymmetries. By combining the first and second types of feedback compensation, relatively accurate symmetry of the comparator means and high resolution signal detection can be effected.

The polarity of current in the output load can either be detected indirectly or directly. In the FIG. 1a embodiment, indirect detection of current is effected by injecting a detection, or read-out current into the Josephson junction $J_4$ via the latch bias control signal input 60. The Josephson junction $J_3$ isolates the QFP 10 from a current detection, or read-out, signal produced across the read-out resistor 64 at node 66. Although a unipolar latch bias control signal is adequate for read-out, a bipolar current (e.g., waveform G in FIG. 1a) is used to accommodate operation of the feedback means.

If a positive read-out current is injected as the latch bias control signal into $J_4$, then a positive load current through the inductor 22 will switch the Josephson junction $J_4$ to a positive voltage state. A negative current will leave $J_4$ switched off in a superconducting state. On the contrary, if the load current and read-out current are both negative, the Josephson junction $J_4$ will switch to a negative voltage state.

Figure 3:
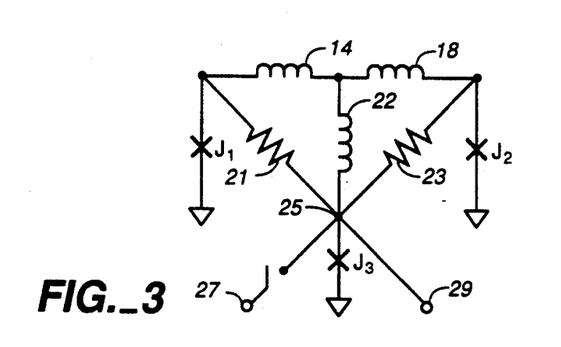
FIG. 3 is an alternate exemplary embodiment of an output portion of the FIG. 1 arbiter circuit.

In alternate direct read-out embodiments, signal arbitration and output functions can be combined. For example, FIG. 3 shows a direct read-out scheme wherein the comparator means includes features described above with respect to FIG. 1a. However, as shown in FIG. 3, the Josephson junction $J_4$ and the resistors 13 and 15 are eliminated.

A first resistor 21 is connected between the ungrounded node of the Josephson junction $J_1$ and an ungrounded node 25 of the Josephson junction $J_3$. Similarly a second resistor 23 is connected between the ungrounded node of the Josephson junction $J_2$ and the node 25. A critical current of the Josephson junction $J_3$ is selected greater than that of $J_1$ and $J_2$. A bipolar latch bias control signal G (as shown in FIG. 1a) is input via a switch 27 to the node 25 of FIG. 3 such that the polarity of a voltage output 29 at node 25 identifies the first received input signal.

In operation, $J_3$ remains in its superconducting state prior to read-out such that node 25 is a virtual ground. To initiate read-out, the bipolar latch bias control signal 6 is input to node 25. $J_3$ switches to its positive voltage state during a positive cycle of the latch bias control signal if a positive current has been stored in the inductor 22. Immediately thereafter, the latch bias control signal is diverted toward $J_1$ and $J_2$, switching them to their positive voltage state.

Alternately, if the two signals $S_1$ and $S_2$ are received in reverse order, $J_3$ switches to a negative voltage state during a negative cycle of the bipolar latch bias control signal. This indicates the storage of a negative current in inductor 22. $J_1$ and $J_2$ switch to their negative voltage state immediately thereafter.

Figure 4:
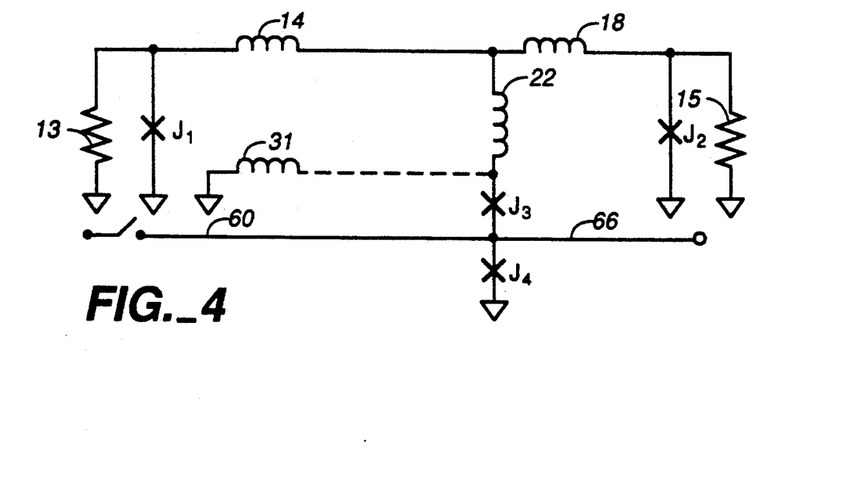
FIG. 4 is yet another exemplary embodiment of an output portion of the FIG. 1 arbiter circuit.

FIG. 4 shows yet another exemplary direct read-out scheme. In FIG. 4, the comparator means and output means are similar to those of FIG. 1a with the key distinction being the inclusion of an inductor 31. The inductor 31 is connected in parallel with $J_3$ and $J_4$.

In operation, $J_3$ latches in its positive (or negative) voltage state during a positive (or negative) cycle of the latch bias control signal if a positive (or negative) current is stored in the inductor 22. When $J_3$ switches from its superconducting state to a voltage state, $J_4$ also switches to a voltage state and isolates the output means from the comparator means as described above with respect to FIG. 1a.

The inductor 31 shunts the combination of $J_3$ and $J_4$ to enhance design margins by increasing the range of critical current values for $J_3$ and $J_4$. If the critical currents of $J_3$ and $J_4$ (i.e., $I_{c3}$, $I_{c4}$, respectively) are equal, correct operation (including device resetting) requires:

$$2\pi L_{eff} I_{c3}/\Phi_0 < \pi$$

where the effective inductance of the comparator means and output means (absent the feedback means) is:

$$L_{eff} = L_{31} \| (L_{22} + 0.5 (L_{14} + L_{J1})); \text{ with}$$

$$L_{J1} = \Phi_0/2\pi I_{c1} \leq L_{J2} = \Phi_0/(2\pi I_{c2}); \text{ and}$$

$$L_{14} = L_{18}$$

Thus, $L_{31}$ lowers the effective inductance $L_{eff}$ and detracts from the current at $J_4$ so that the critical current of $J_4$ can be rendered equal to that of $J_3$.

In an alternate exemplary indirect read-out method, an additional SQUID can be magnetically coupled with the inductor 22. Because the additional SQUID includes two Josephson junctions, the Josephson junctions $J_3$ and $J_4$ of the output load can be eliminated without degrading performance.

Figure 5:
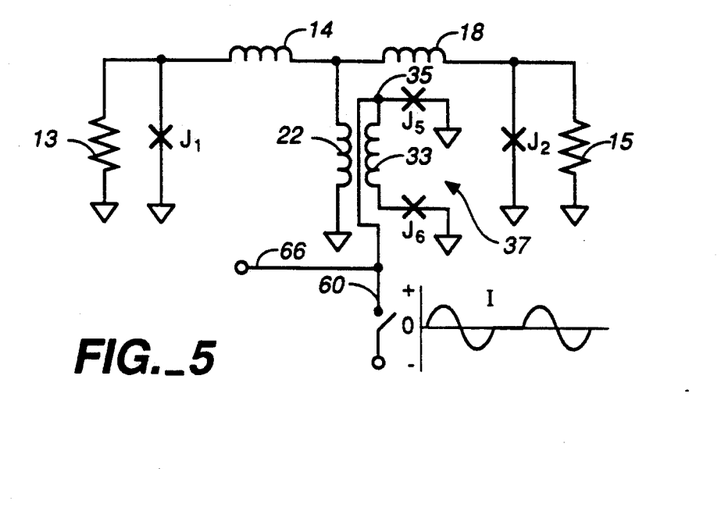
FIG. 5 is an alternate exemplary embodiment of an arbiter circuit with indirect read-out.

For example, in an exemplary indirect read-out scheme shown in FIG. 5, the output means includes an output SQUID 37 with an inductor 33 magnetically coupled to inductor 22. The inductor 33 is serially connected between fifth and sixth Josephson junctions $J_5$ and $J_6$, respectively. Opposite nodes of $J_5$ and $J_6$ are grounded. The bipolar latch bias control signal G (FIG. 1a) is input to a node 35 located between the inductor 33 and $J_5$. An output 66 is read at node 35.

In operation, the latch bias control signal is fed asymmetrically into the SQUID 37 nearer to $J_5$ relative to $J_6$. The SQUID 37 therefore latches into one of either a positive or negative voltage state (but not both) during the positive or negative cycle of the latch bias control signal if positive or negative current is stored in the inductor 22. If voltage latching occurs, the SQUID 37 is automatically isolated from the comparator means due to the magnetic coupling of the output means with the comparator means.

Alternate embodiments of the output means latch bias control signal will also be apparent to those skilled in the art. For example, at low repetition rates, a sinusoidal bipolar clock waveform with dead time between each cycle of the waveform as shown by waveform I in FIG. 5 is preferred. The arbitration of the two input signals occurs during the dead time. A bipolar latch bias control signal is used to discern a positive output or a negative output from an absence of voltage at the latch output. Where an output is desired regardless of the number of input signals received, the use of a bipolar latch bias control signal affords some redundancy and provides a self-consistency (error checking) capability for the arbitration circuit.

At very high repetition rates (e.g., $GH_2$ range), a unipolar (e.g., positive) clock is useful for discerning a positive output voltage from an absence of voltage at the latch output. Such a waveform corresponds to the positive or negative half cycle of the latch bias control signal shown in FIGS. 1a and 5.

Figure 6:
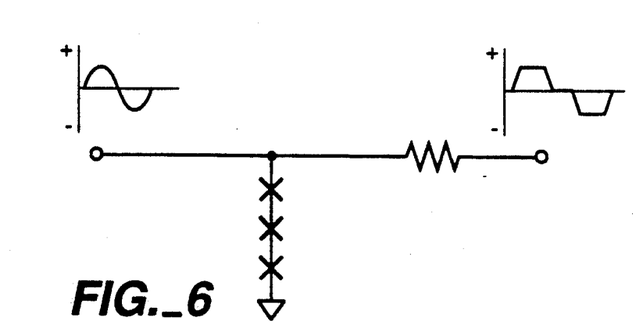
FIG. 6 is an exemplary embodiment of an on-chip signal generator for a bipolar latch bias control signal.

An on-chip signal generating circuit for producing a bipolar waveform, even at gigahertz repetition rates, is shown in FIG. 6. In FIG. 6, one or more Josephson junctions whose critical currents are larger than that of the read-out devices are serially stacked. A sinewave is used to drive the signal generating circuit. The non-linear current voltage characteristic of the Josephson junctions converts the sinewave to a piecewise-linear bipolar waveform with a dead time corresponding to superconducting states of the Josephson junctions.

Figure 7:
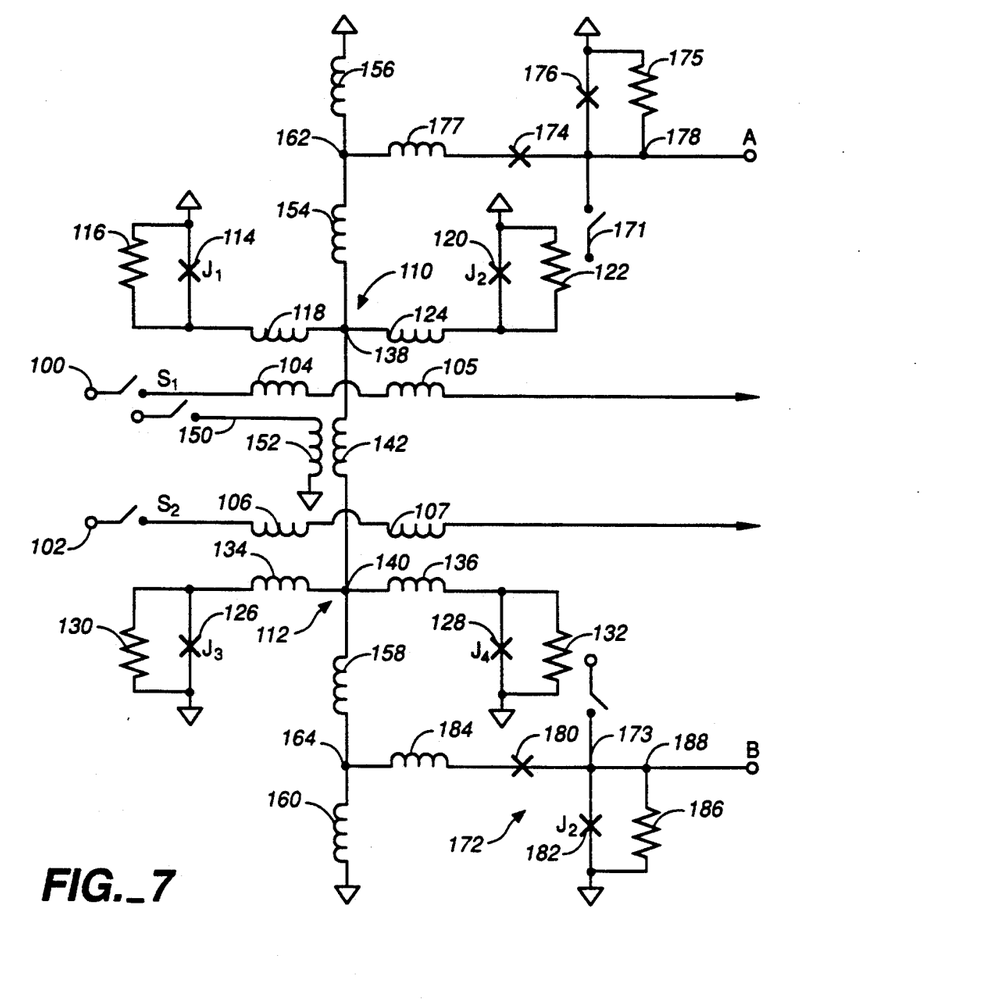
FIG. 7 is an exemplary alternate embodiment of an arbiter circuit.

An alternate embodiment of the present invention is shown in FIG. 7. The FIG. 7 apparatus is an arbiter circuit which includes means for inputting signals whose waveforms are to be analyzed, a comparator means for distinguishing arrival time of the input signals, and output means for outputting information which identifies the arrival sequence of the input signals.

As shown in FIG. 7, the input means includes at least two signal inputs 100 and 102 for receiving input signals $S_1$ and $S_2$, respectively. The signal input 100 further includes two series inductors 104 and 105. The signal input 102 further includes two series inductors 106 and 107. The series inductors 104-107 are magnetically coupled with the comparator means.

The comparator means includes two differentially connected QFPs 110, 112, a flux input 150 and two comparator output loads. The QFP 110 includes first and second loops. The first loop includes a first Josephson junction 114 (labelled $J_1$) connected in parallel with a shunt resistor 116 and connected in series with inductors 118 and 154. The second loop of QFP 110 includes a second Josephson junction 120 (labelled $J_2$) connected in parallel with a shunt resistor 122 and connected in series with inductors 124 and 154. The inductors 118 and 124 are magnetically coupled with the inductors 104 and 105, respectively of the first signal input 100.

Similarly, the QFP 112 includes first and second loops. These loops include third and fourth Josephson junctions 126, 128 (labelled $J_3$ and $J_4$, respectively), first and second parallel shunt resistances 130, 132, first and second series inductors 134, 136, respectively and a common inductor 158. The series inductors 134 and 136 are magnetically coupled with the inductors 106 and 107, respectively of the second signal input 102.

Center nodes 138 and 140 of the two QFPs are connected with one another through a relatively small bridge inductor 142. The inductor 142 is magnetically coupled with an inductor 152 of a flux input 150. The flux input generates a DC bias current which induces current in the inductor 142. An initial bias current $I_{INIT}$ flows out of the lower shunted QFP 112 and into the upper shunted QFP 110 via the inductor 142.

A first comparator output load includes inductor 154 connected in series between node 138 of the QFP 110 and ground. A comparator output node 162 is located between the inductors 154 and 156. A second comparator output load includes inductor 160 connected in series between node 140 of the QFP 112 and ground. A second comparator output node 164 is located between the inductors 158 and 160.

The output means includes two latch output nodes A and B, and two latch circuits 170 and 172. The latch circuits 170 and 172 each include an output SQUID.

The output SQUID of latch 170 includes two Josephson junctions 174 and 176 connected in series between ground and comparator output node 162 via an inductor 177. A shunt resistor 175 is connected in parallel with the Josephson junction 176. A node 178 between the Josephson junctions 174 and 176 constitutes output node A of the FIG. 7 circuit, and receives a latch bias current (e.g., the aforementioned bipolar current) via a control signal input 171.

The SQUID of latch 172 includes two Josephson junctions 180 and 182 connected in series between ground and comparator output node 164 via an inductor 184. A shunt resistor 186 is connected in parallel with the Josephson junction 182. A node 188 between the Josephson junctions 180 and 182 constitutes output node B of the FIG. 7 circuit and, like node 178, receives a latch bias current via a control signal input 173.

Operation of the FIG. 7 circuit will now be described. Input signals $S_1$ and $S_2$ possess the same frequency and amplitude, differing only in their time relationship with one another. For purposes of explanation, a rising edge of the signals $S_1$ and $S_2$ is used to identify their time relationship. However, the invention is not limited to the detection of rising edges. For example, those skilled in the art will recognize that falling edges can also be detected by interpreting outputs of the circuit in opposite fashion.

In operation, the voltages at output nodes A and B are observed following activation of the latch bias control signals. As with the circuits described above, these output voltages will identify the relative order of the input signals $S_1$ and $S_2$ with a subpicosecond resolution (e.g., within a tenth of a picosecond) in a manner similar to that described with respect to FIG. 1a.

More particularly, when signal S1 arrives at input 100 before signal $S_2$ arrives at input 102, a circulating current is induced in the QFP 110. This circulating current combines with the bias current $I_{INIT}$ to momentarily switch $J_1$ out of its superconducting state. The phase of $J_1$ advances approximately $2\pi$ and the QFP 110 enters what will be referred to as a +1 quantum, or vortex state. The current in the inductor 142 subsequently reverses polarity to establish an intermediate detection state of the circuit.

Afterwards, when signal $S_2$ later arrives, it induces a circulating current in the QFP 112. This current combines with the intermediate detection state current (opposite in sign to $I_{INIT}$) to momentarily switch $J_3$ out of its superconducting state. The phase of $J_3$ advances approximately $2\pi$ and the QFP 112 enters a +1 quantum, or vortex, state. The current in the inductor 142 again reverses polarity to establish a final detection state of the circuit represented by the aforementioned mode (0,1).

In the final state, both $J_1$ and $J_3$ are in the +1 vortex state wherein the currents coupled to the SQUIDs of latches 170 and 172 are both positive. When the latch bias currents are subsequently positively activated, both of these SQUIDS latch to the positive voltage state at output nodes A and B, respectively.

When signal $S_2$ arrives at input 102 before signal $S_1$ arrives at input 100, operation is as follows. The signal $S_2$ induces a circulating current in the QFP 112. This circulating current combines with the bias current $I_{INIT}$ to momentarily switch $J_4$ out of its superconducting state. The phase of $J_4$ retreats approximately $-2\pi$ and the QFP 112 enters what will be referred to as a $-1$ quantum, or vortex, state. The current in the inductor 142 subsequently reverses polarity to establish an intermediate detection state.

Afterwards, when signal $S_1$ later arrives, it induces a circulating current in the QFP 110 which combines with the intermediate detection state current (opposite in sign to $I_{INIT}$) to momentarily switch $J_2$ out of its superconducting state. The phase of $J_2$ retreats to about $-2\pi$ and the QFP 110 enters a $-1$ quantum, or vortex, state. The current in the inductor 142 again reverses polarity to establish a final detection state represented by the aforementioned mode (1,0).

In this final detection state, current coupled to the SQUIDs of latches 170 and 172 are both negative. Thus, when the latch bias currents are positively activated, these SQUIDs remain in their superconducting state at output nodes A and B, respectively.

When the two signals $S_1$ and $S_2$ arrive simultaneously at inputs 100 and 102, the aforementioned intermediate detection states cannot occur. Rather, both QFPs 110 and 112 respond to $I_{INIT}$ such that $J_1$ advances in phase to approximately $2\pi$ while $J_4$ retreats in phase to approximately $-2\pi$. When the latch bias currents are activated, the SQUID of latch 170 switches to its voltage state while the SQUID of latch 172 remains superconducting.

Figure 8:
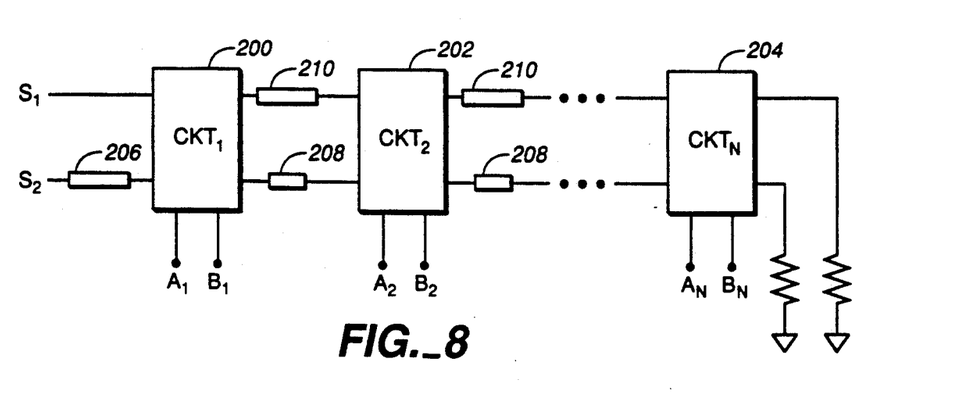
FIG. 8 is an exemplary embodiment wherein plural arbiter circuits have been chained together sequentially.

To measure an exact delay between the two signals $S_1$ and $S_2$, multiple arbiter circuits can be combined, or sequentially chained, in series as shown in FIG. 8. In an exemplary embodiment, each of the arbiter circuits 200, 202 and 204 correspond to any of the arbiter circuits described herein. A predetermined, fixed delay 206 is applied to the signal $S_2$ input. For example, this delay 206 is a fixed time delay $N\Delta\tau$. The value $N\Delta\tau/2$ is selected large enough that signal $S_1$ will arrive at the arbiter circuit 200 earlier than the signal $S_2$.

Superconducting transmission lines are used to propagate the signals $S_1$ and $S_2$ between arbiter circuits. The signal $S_2$ is transmitted between each arbiter circuit through a delay 208, represented as $Z_0, \tau$. The signal $S_1$ is transmitted between each arbiter circuit through a delay 210 $2\pi$, represented as $Z_0, \tau + \Delta\tau$;.

During an initialization sequence of the FIG. 8 circuit, feedback techniques as detailed above with respect to FIGS. 1 and 7 can be used to compensate for circuit parameter variations in the entire chain of arbiters. Two identical signals with a risetime much longer than $N\Delta\tau$ are applied to the signal inputs of the FIG. 8 arbiter circuit 200. The very slow risetime renders the electrical path differences between the two sides of the arbiter chain irrelevant. With the feedback switch (e.g., a feedback switch such as switch 44) enabled, all of the chained arbiters will converge to a state where they switch positively and negatively with equal frequency. Once this stage is reached, the feedback switch can be disabled and normal operation of the FIG. 8 arbiter chain can begin.

The value $\Delta\tau$ in the FIG. 8 circuit is preferably chosen to be approximately equal to the time resolution of an individual arbiter. The value of N is preferably large enough to accommodate the largest time differences of interest.

Because the signals $S_1$ and $S_2$ propagate between arbiters with a small superconducting crossover inductance, they can be propagated over a large number of arbiter circuits with only minimal distortion. Further, any distortion which does occur influences both signals $S_1$ and $S_2$ equally such that chronological ordering of these signals is not affected. The inclusion of a larger delay in the signal $S_1$ transmission line insures that $S_2$ will arrive at the last serially connected arbiter before $S_1$. At one of the arbiter circuits, the two signals $S_1$ and $S_2$ will be nearly coincident such that the A and B output nodes of that arbiter will begin to change. By identifying the arbiter circuit where the A and B output nodes begin to change, the time difference between the signals $S_1$ and $S_2$ can be accurately identified.

It will be appreciated by those skilled in the art that variations to any of the aforementioned embodiments can be implemented. For example, an arbitration circuit can be selectively controlled to render a decision if only one signal is received. In an exemplary embodiment, components of the comparator means are adjusted such that the critical current threshold of the Josephson junction in the output means can only be attained by a finite superposition of the two signals $S_1$, $S_2$ (i.e., some overlap in the rising edges of the two step waveforms). For this purpose, the inductor 22 is selected much larger than the inductor 14 and the input means is weakly coupled to the comparator means.

Alternately, the circuit may be controlled to detect whether both signals have arrived or whether no signals have been received. In an exemplary embodiment, the inductor 22 is selected comparable to or smaller than the inductors 14 and 18, and a strong coupling is provided between the input means and the comparator means.

Although the foregoing description of exemplary embodiments has been based on the use of identical, phase delayed input signals, any of various arbitration conditions can be detected as previously mentioned. For example, FIG. 9 shows an exemplary embodiment of an arbitration circuit for detecting counter-propagating input signals of the same polarity (e.g., waveforms W and X).

Figure 9:
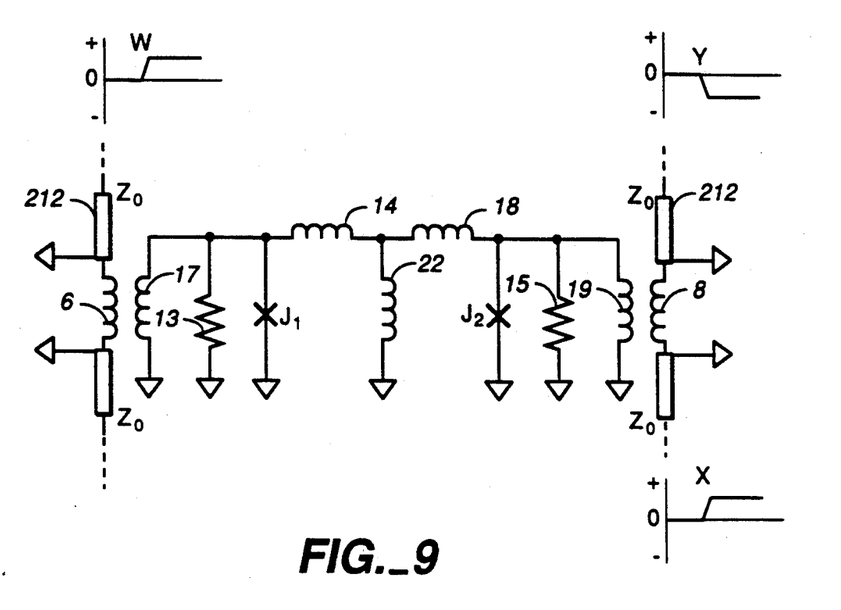
FIG. 9 is an alternate exemplary embodiment of input and comparator portions in an arbiter circuit.

FIG. 9 shows a comparator means such as that of FIG. 1a. However, transmission lines 212 are chosen with a characteristic impedance $Z_0$ for carrying the input signals to the comparator means. $Z_0$ is chosen large enough that the inductive time constants of the signal inputs $L_6/Z_0$ and $L_8/Z_0$ are small relative to a rise time of the input signal waveforms (e.g., rising edge of step input waveform). This insures minimal signal distortion as the input signals pass through the inductors 6 and 8. The FIG. 9 arbitration circuit can also be used where the input signals are of opposite polarity and co-propagating (e.g., waveforms W and Y).

Figure 10:
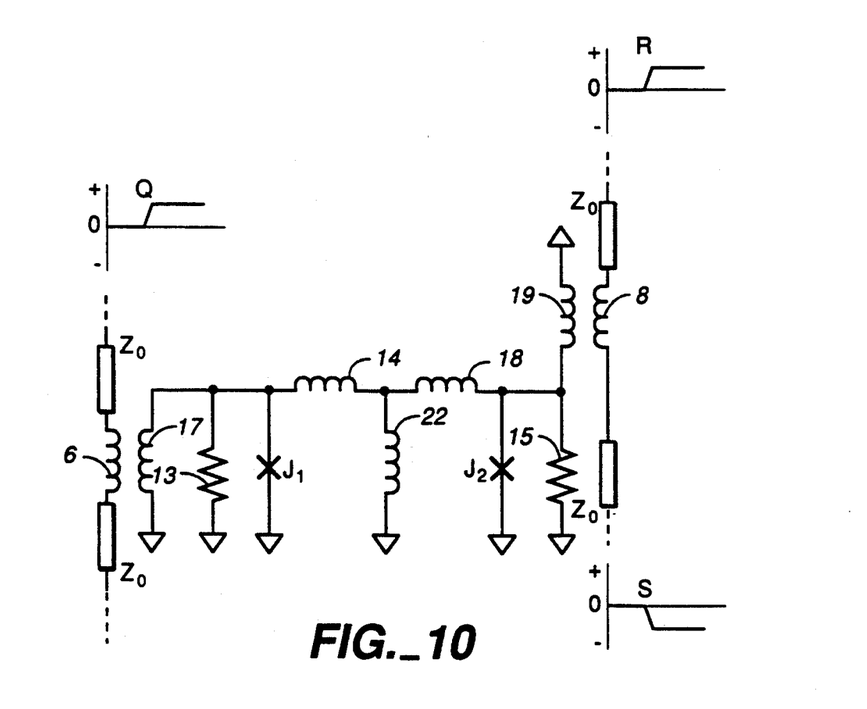
FIG. 10 is yet another alternate exemplary embodiment of input and comparator portions in an arbiter circuit.

Alternately, the FIG. 10 circuit can be used where the input signals are of the same polarity and co-propagating (e.g., waveforms Q and R) or of opposite polarity and counter-propagating (e.g., waveforms Q and S). In FIG. 10, the inductor 19 of the FIG. 9 comparator means is reverse coupled with the inductor 8 of the input means.

Further, any of the various input waveforms can be used with any of the exemplary arbitration circuits described. In addition, the function of input signal control switches (e.g., switches 31, 44 and 61) can be effected by establishing an appropriate timing relationship between the various selected control signal waveforms.

It will be appreciated that the present invention can be embodied in other specific forms without departing from the spirit or essential characteristics thereof. The present disclosed embodiments are therefore considered in all respects to be illustrative and not restrictive. The scope of the invention is indicated by the appended claims rather than the foregoing description, and all the changes that come within the meaning and range and equivalents thereof are intended to be embraced therein.

What is claimed is:

1. Apparatus for determining an arrival order of at least two input signal waveforms comprising:

input means for inputting at least two signals whose waveforms are to be analyzed;

comparator means for distinguishing relative arrival order of the input signals, said comparator means further including first means for quantizing flux; and, output means for outputting information based on an output of said comparator means which identifies an arrival of at least one of said input signals.

2. Apparatus according to claim 1, wherein said input means further includes:

means for magnetically coupling with said comparator means.

3. Apparatus according to claim 1, further including:

feedback means for compensating asymmetries in the comparator means.

4. Apparatus according to claim 3, wherein said feedback means further includes:

means for activating feedback means prior to inputting of said signal waveforms via said input means.

5. Apparatus according to claim 3, wherein said feedback means further includes:

means for activating feedback means during inputting of said signal waveforms via said input means.

6. Apparatus according to claim 3, wherein said feedback means further includes:

a feedback control signal input for inputting a feedback control signal;

second means, responsive to said feedback control signal, for quantizing flux; and a feedback inductor for magnetically coupling said quantized flux to said comparator means.

7. Apparatus according to claim 6, wherein said first means for quantizing flux is a quantum flux parametron comprising two loops, each of said loops having at least one Josephson junction.

8. Apparatus according to claim 7, wherein each Josephson junction further includes:

a shunt inductor magnetically coupled with said input means.

9. Apparatus according to claim 8, wherein said output means further includes:

means for directly reading out a latched state of said comparator means in response to a latch bias control signal.

10. Apparatus according to claim 9, wherein said read-out means further includes:

a signal generator for generating a bipolar latch bias control signal, said signal generator comprising at least one Josephson junction.

11. Apparatus according to claim 9, wherein said comparator means further includes:

an output load for latching a state of said comparator means, each loop of said comparator means further including a resistor connected to said output means.

12. Apparatus according to claim 9, wherein said comparator means further includes:

an output load for latching a state of said comparator means, said output load further including an inductor serially connected with two additional Josephson junctions coupled in parallel with a shunt inductor.

13. Apparatus according to claim 8, wherein said output means further includes:

means for inductively reading a latched state of said comparator means.

14. Apparatus according to claim 13, wherein said output means further includes:
   means for quantizing flux.

15. Apparatus according to claim 1, wherein said comparator means further includes:
   an output load, said output load comprising a serial connection of an inductor and at least one Josephson junction for latching a state of said comparator means; and,
   a flux input for biasing plural loops of said comparator means.

16. Apparatus according to claim 1, wherein said input means further includes:
   a signal input having a characteristic impedance Z and a coupling inductance L which are selected such that L/Z is less than a rise time of an input signal waveform propagating through the characteristic impedance and the coupling inductance.

17. Apparatus according to claim 16, wherein said input means further includes:
   signal inputs for receiving two input signals of opposite polarity.

18. Apparatus according to claim 16, wherein said input means further includes:
   signal inputs for receiving two counter-propagating input signal waveforms.

19. Apparatus according to claim 17, wherein said input means further includes:
   signal inputs for receiving two counter-propagating input signal waveforms.

20. Apparatus according to claim 1, further including:
   at least one additional input means, one additional comparator means, and one additional output means, said at least one additional input means receiving input signal waveforms from said output means for measuring a time delay between said input signals whose waveforms are to be analyzed.

21. Apparatus according to claim 20, wherein said at least one additional input means further includes:
   at least two signal inputs, each of said two signal inputs including first and second fixed delays, respectively, said first fixed delay being greater than said second delay.

22. Apparatus according to claim 20, further including:
   feedback means for simultaneously compensating asymmetries in said comparator means and said at least one additional comparator means.

23. Apparatus according to claim 1, wherein said comparator means further includes second means for quantizing flux, said second means for quantizing flux being differentially connected with said first means for quantizing flux.

24. Apparatus for determining an arrival order of at least two input signal waveforms comprising:
   input means for inputting at least two signal waveforms;
   comparator means for comparing relative arrival times of the input signal waveforms, said comparator means being magnetically coupled to said input means and including means for biasing flux of said comparator means, a quantum flux parametron having at least one Josephson junction in each of two loops, and an output load for latching a quantum flux state of said comparator means;
   feedback means for compensating asymmetries in the comparator means, said feedback means further including a superconducting quantum interference device for quantizing flux, and a feedback inductor for magnetically coupling said quantized flux to said comparator means; and
   output means for outputting said latched quantum flux state of said comparator means, said output means further including means for reading said latched quantum flux state in response to a latch bias control signal.

25. Apparatus according to claim 24 wherein said feedback means further includes:
   a feedback control switch for selectively activating said feedback means to compensate asymmetries in the comparator means.

26. Method for determining an arrival order of at least two input signal waveforms comprising the steps of:
   inputting at least two signals whose waveforms are to be analyzed;
   comparing relative arrival order of the input signal waveforms, said step of comparing further including steps of quantizing flux in a superconductive loop and storing a quantum flux state of said superconductive loop;
   outputting information which identifies the arrival of at least one of said input signal waveforms; and
   compensating asymmetries in said superconducting loop.

* * * * *